Aug. 18, 1931.  H. C. STEARNS  1,819,849
GASOLINE GAUGE FOR AUTOMOBILES
Filed March 29, 1926   3 Sheets-Sheet 3
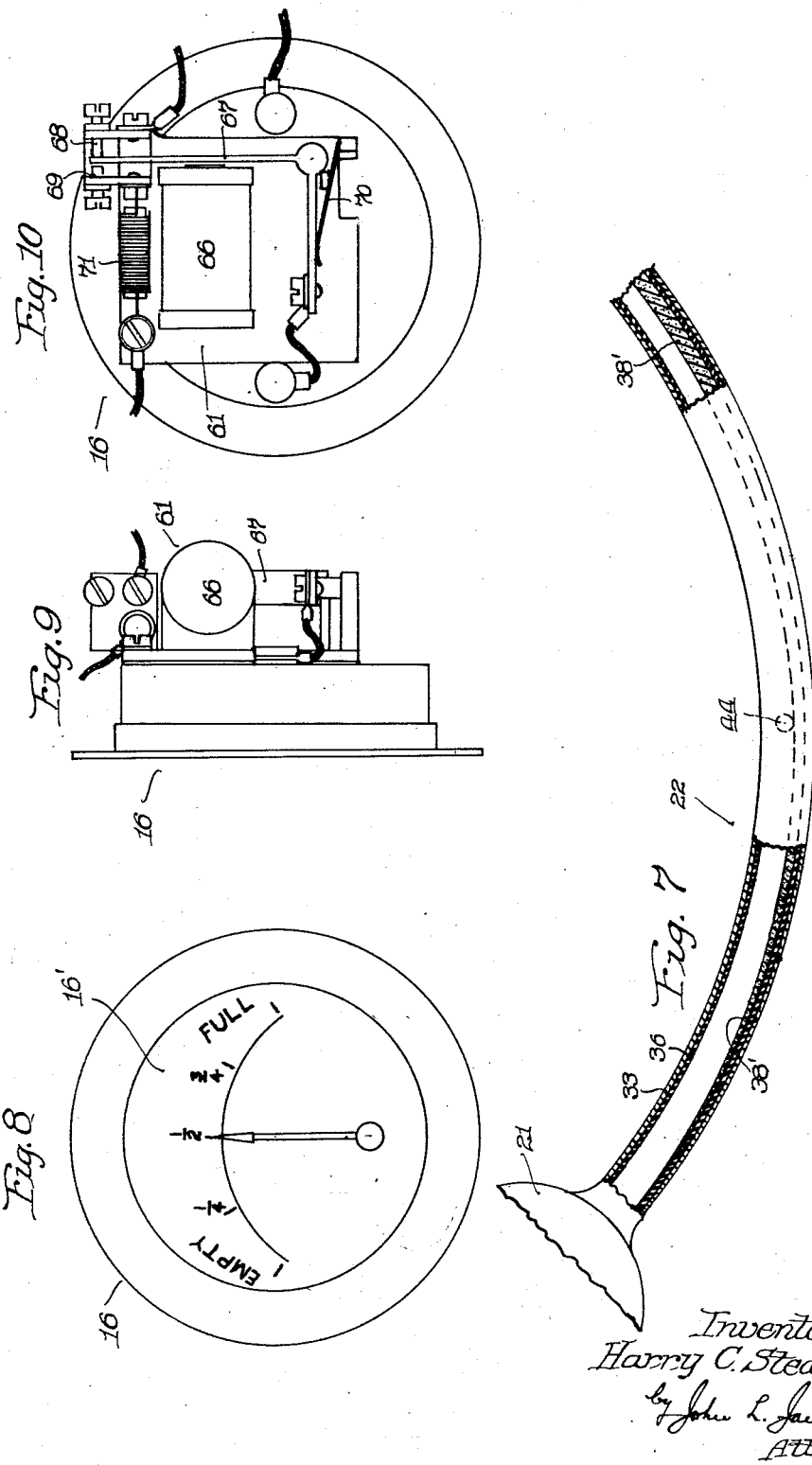
Inventor
Harry C. Stearns
by John L. Jackson
Atty Patented Aug. 18, 1931

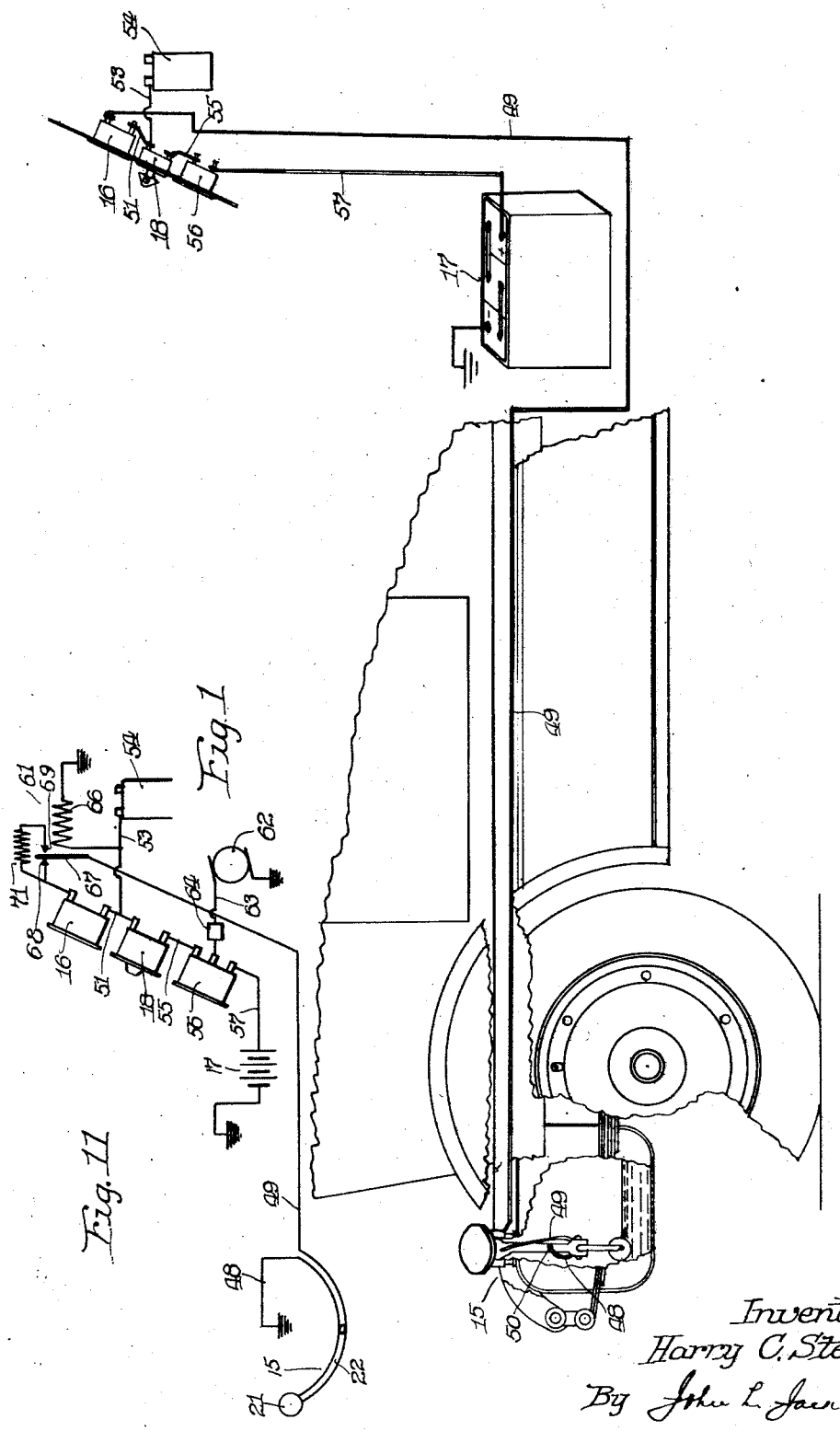

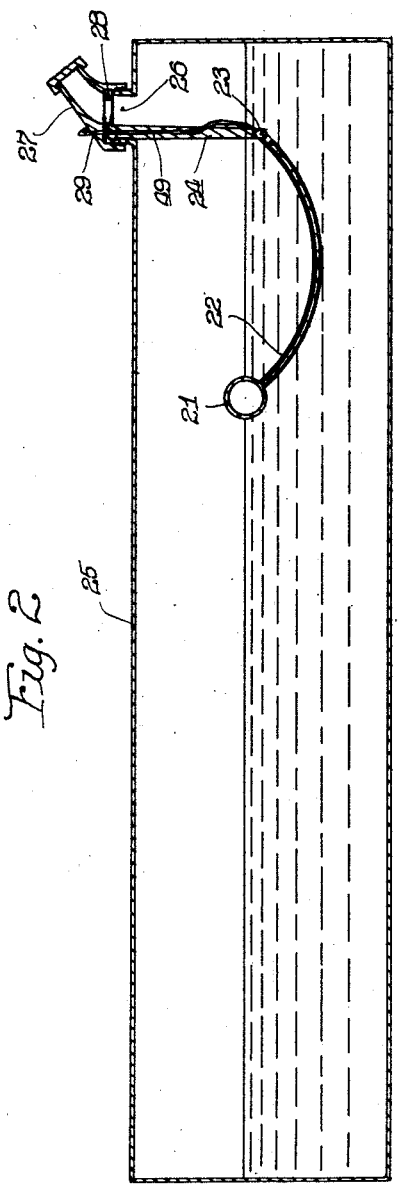
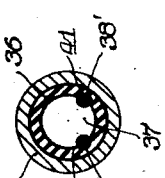
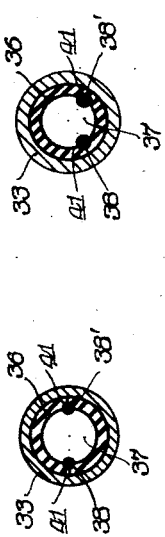
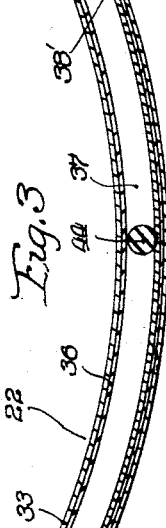
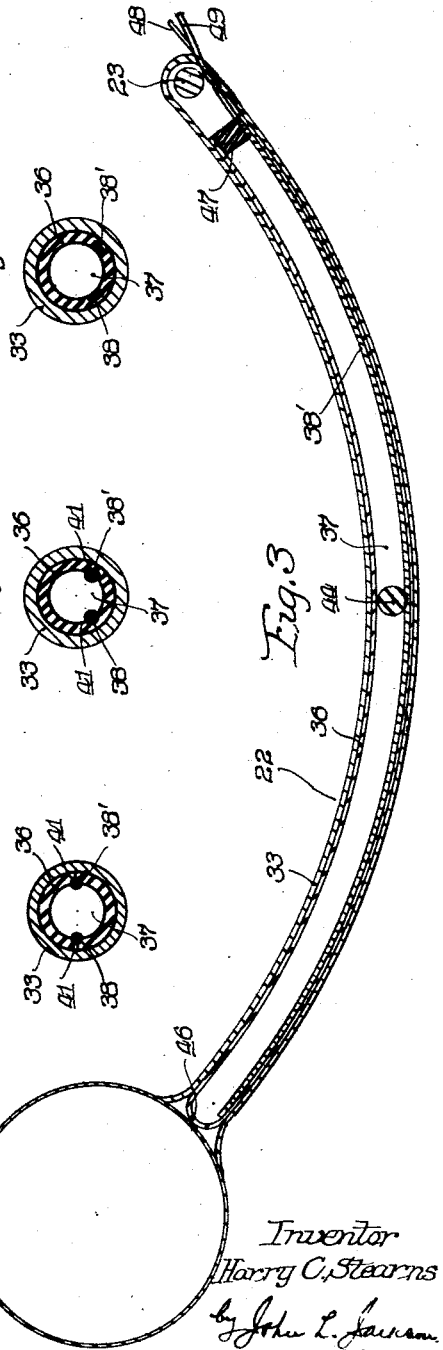

1,819,849

UNITED STATES PATENT OFFICE

HARRY C. STEARNS, OF OAK PARK, ILLINOIS, ASSIGNOR OF ONE-THIRD TO CAMERON A. WHITSETT, OF CHICAGO, ILLINOIS, AND ONE-THIRD TO HOMER W. LARSON, OF DOWNERS GROVE, ILLINOIS

GASOLINE GAUGE FOR AUTOMOBILES

Application filed March 29, 1926. Serial No. 98,158.

The present invention relates to gasoline gauges for automobiles, and has particular reference to that type of gauge for indicating on the dash board the quantity of gasoline contained in the supply tank.

One of the particular objects of the invention is to provide an electrical gauge of this type in which all contact difficulties have been eliminated. Heretofore, electrical gauges operating upon the theory of varying the resistance of an electrical circuit have been objectionable because of contact difficulties which introduce variable and uncontrollable resistances in the circuit. I have avoided all of these prior difficulties by a unique relation of resistance element and contact element, the latter operating with a gravitational rolling motion along the resistance element.

A further object of the invention is to provide a gauge of this general type which can be embodied in the form of an accessory adapted for ready installation in different makes of cars, or which can be built into the automobile construction as a standard part of its equipment.

A further object of the invention is to provide improved means for compensating the gauge for variations in the potential effective on the battery terminals. These variations may arise as a result of different speeds of the charging generator. As a practicable matter, it is very seldom that such compensating means would be necessary, as these voltage variations are so slight that their influence on the gauge may be disregarded. However, in installations where this voltage variation is considerable with the different rates of speed of the charging generator, such compensating device may be used.

Other objects and advantages of my invention will be apparent from the following description of a preferred embodiment thereof. In the drawings accompanying this description:

Figure 1 is a fragmentary schematic view of an automobile illustrating my improved gasoline gauge installed therein.

Figure 2 is a longitudinal sectional view through the fuel supply tank, illustrating the mounting of the tank unit therein.

Figure 3 is a longitudinal sectional view of the float and its arm in which is embodied the resistance and contacting elements.

Figure 4 is a transverse sectional view through this float arm, on a slightly larger scale illustrating one arrangement of the resistance elements.

Figures 5 and 6 are similar sectional views illustrating modified arrangements of the resistance elements.

Figure 7 is a fragmentary view similar to Figure 3, illustrating a modified form of resistance element.

Figure 8 is a front elevational view of the dash board indicator.

Figures 9 and 10 are side and rear elevational views of this indicator, illustrating the compensating relay mounted thereon where such relay is employed; and Figure 11 is a circuit diagram of the electrical connections.

Figure 1 illustrates in schematic outline a typical installation of my improved gasoline gauge in an automobile. The gauge in its entirety comprises a tank unit 15 and an indicator unit 16. These two units are connected in an electrical circuit including the usual storage battery 17, which energizes the circuit. The circuit for the gauge may be extended through the ignition switch 18, usually mounted on the dash, so that this gauge circuit is only completed and operative to indicate the quantity of gasoline in the supply tank when the ignition system is turned on. In the particular adaptation shown, I have illustrated the gauge as installed in an automobile having a gasoline tank disposed at the rear. However, it will be understood that the gauge has equal application to gasoline tanks disposed under the front seat or under the cowl or at any other point in the car.

Referring first to the tank unit 15, it will be observed (Figure 2) that this unit comprises a float 21 secured to the end of a curved tubular arm 22. This arm is pivoted at its opposite end at 23 to a standard or support 24 extending down into the fuel tank 25. When the device is constructed in the form of an accessory for installation in different makes of cars, the float 21 is constructed sufficiently small so that it will pass through the filler opening 26 extending upwardly from the side or end of the tank. This filler opening is usually provided with a nozzle 27, screwed or pinned to the flange or other element constituting the filler opening 26. This nozzle 27 is usually readily removable, and the removal of such nozzle affords a relatively large unobstructed passageway into the interior of the tank, through which the float 21, arm 22 and support 24 can be inserted. The upper end of the support 24 is carried on a ring or spider 28 which is adapted to set on the flange or in the opening constituting the filler opening 26. In some instances it may be desirable to provide a special spout or inlet nozzle 27 which will be substituted for the standard nozzle, and which will either carry the support 24 as a unitary part thereof, or which will accommodate the supporting ring 28. Where this special form of nozzle 27 is employed, this nozzle will be provided with an opening 29 through which the conductor or conductors constituting part of the gauge circuit can be led.

In the event that the gauge is built into the automobile as a standard part of its construction, the float 21 and arm 22 may be pivotally supported at any preferred point in the tank 25.

Referring to Figure 3, the float 21 is of any suitable construction, preferably consisting of a hollow metallic sphere. The arm 22 comprises a tubular casing 33 which is soldered or otherwise secured at one end to the float 21. The other end of this tubular casing has any suitable pivotal mounting on the pivot stud 23. In the preferred construction shown, this end of the tubular casing is closed over and the pivot stud 23 is passed through aligned apertures in opposite sides of the casing at this closed end. This casing 33 is of curved form, being preferably struck on the arc of a true circle although it may have a catenary curvature or any other desired outline for securing a particular graduation of the resistance values. Inserted in this tubular casing 33 is a sheath or lining 36 of insulating material, such as hard rubber, porcelain, a phenol condensation product, etc. Extending through the bore 37 of this insulating sheath are two resistance elements 38—38'. These resistance elements 38—38' are preferably composed of some resistance material or compound with which mercury will not amalgamate or react. As illustrative of one composition of these resistances, and method of mounting the same, they may be composed of a compound of a conducting material such as carbon or graphite mixture with the proper proportions of clay or other similar material to serve as a binder. The bore 37 of the insulating liner is provided with longitudinal grooves or depressions 41 in which this resistance compound is molded or inserted. For example, the insulating lining 36 may be formed of two sections split along a longitudinal plane, and the resistance compound molded in the grooves 41 while these two sections are separated. Thereafter, the two sections of the insulating liner are assembled and are subjected to a baking or heating operation which will glaze the two sections together and will secure the resistance compound in the grooves 41.

Contacting with these resistance elements 38—38' is a contacting element 44 preferably consisting of a globule of mercury. The bore 37 is constructed sufficiently small so that this globule of mercury will remain in unit form in its rolling motion back and forth in the tubular arm. The relatively high molecular cohesion of mercury will retain this globule or sphere of mercury in unit form even under severe vibration, and if under relatively heavy vibration the globule should break up momentarily, the particles of mercury will instantly re-unite as soon as the vibration ceases.

It will be apparent that the mercury will move back and forth through this tubular arm under gravitational influence, always seeking the lowest point of the tube. Hence, as the float 21 rises and falls, this mercury contacting element will move back and forth, bridging the resistance elements 38—38' at different points of their lengths depending upon the level of the fuel in the supply tank. This mercury globule will not amalgamate or otherwise react with the resistance elements such as I have described, and will always maintain intimate contact with the resistance elements so that there will be no variation of contact resistance in the movement of the mercury globule through the tube.

The ends of the insulating sheath 37 are preferably hermetically sealed as indicated at 46 and 47, the latter preferably consisting of a suitable insulating plug which may be glazed into the end of the insulating sheath. If desired, the interior of the insulating tube 36 may be evacuated so as to avoid any possibility of the air damping motion of the mercury globule, although the globule is preferably made of sufficiently small size so that sufficient area remains around the globule to permit the ready passage of air, where such air is contained in the tube.

This insulating sheath or tube 36 may be inserted into the open end of the tubular casing 33 before this end is joined to the float 21. The two resistance elements 38—38' are included in an electrical circuit in which is connected the dash indicator 16, wires 48 and 49 connecting to these resistance elements and passing out through the plug 47 for connection in this circuit.

In Figures 5 and 6, I have illustrated modifications in which resistance elements 38—38' are disposed adjacent the lower part of the tube bore 37. In Figure 6, these resistance elements are recessed completely in the wall of the tube so that, in section, the bore of the tube is of uniform circular outline. In lieu of the mercury globule, a metallic sphere might be employed in which event the resistance elements would preferably be located adjacent the lower side of the bore 37 so as to insure continuous contact between this metallic sphere and the resistance elements.

In Figure 7 I have shown a construction wherein the resistance elements 38—38' are of tapering section, the large ends preferably starting at the pivot end of the tubular arm and tapering down to comparatively small thicknesses adjacent the float end of the arm. This tapering cross-section will afford a wide variation of resistance in the circuit.

The circuit connections may be variously arranged so as to include the dash indicator 16 and the storage battery 17. The two resistance elements 38—38' are included in series in this circuit, and as the contacting element 44 rolls along these resistance elements with the rise and fall of the float 21 the resistance and consequent current flow in this circuit will be varied. In the preferred embodiment, the dash indicator 16 consists of a milliammeter with its dial or indicating face 16' calibrated in gallons or in fractional parts of the supply tank capacity. With this indicator included in series in the aforesaid circuit, it will be evident that it will indicate, by variation in the current flow in this circuit, the contents of the supply tank. The device is so constructed that at all times in its operation only an extremely small current consumption occurs so that it does not place any appreciable drain on the battery 17. This may be obtained by proportioning the curved arm 22 so that even with the float 21 in its highest position, the contacting element will remain a considerable distance from the ends of the resistance elements, whereby a high resistance is always maintained in the circuit; or a resistance of any desired value may be included in the circuit at any other point.

In the particular circuit arrangement shown, the wire 48 is grounded, as by connecting the same to the tubular arm 22 or standard 24, as indicated at 50 in Fig. 1. The other wire 49 is extended up to one of the terminals of the dash indicator 16. The other terminal of this dash indicator can, if desired, be connected directly to the ungrounded terminal of the battery 17. With this arrangement, however, the gauge would be operative at all times, and while its current consumption is so small that it would not run down the battery unless the car were left standing for several weeks, nevertheless, it is preferable to connect this gauge circuit to some other control or operating part of the car which is operated or switched on and off in the operation of the car. Accordingly, in Figure 1, I have shown the other terminal of this dash indicator 16 as being connected through wire 51 to the "coil" side of the ignition switch 18. This "coil side" is represented by the wire 53 leading to the ignition coil 54. In conventional practice the other side of this ignition switch is connected through wire 55 to one terminal of the usual dashboard ammeter 56. From the other terminal of this ammeter a wire 57 leads to the ungrounded terminal of the battery 17, which is generally the positive terminal thereof. It is customary to combine in the ignition switch the lighting switch of the car and in order that the ammeter will show the total current consumption of both lights and ignition it is generally connected as shown.

With the gauge circuit connected to the coil side of the ignition switch 18, it will be evident that when the ignition switch is in its off position, corresponding to a condition when the engine is not running, the circuit of the gauge will be open and all current flow in this circuit interrupted. As soon as the ignition switch is turned on for the starting of the engine, the battery connection through the dash indicator 16 is completed and the gauge thereupon becomes operative.

Generally speaking, any inaccuracies caused in the scale reading by higher generator potentials effective on the battery will be relatively small and may be disregarded. However, where compensation for such higher potentials is desired, I have provided means for accomplishing this end in the form of a relay 61 which is operative to include additional resistance in the gauge circuit when the generator voltage rises above a predetermined point. This relay may conveniently be mounted on the back of the indicator 16, as shown in Figures 9 and 10. Figure 11 illustrates a representative circuit for this relay. Referring to this circuit diagram, the generator 62 is generally connected through wire 63 and voltage relay 64 to one side of the battery circuit, usually at the ammeter 56. The other side of the generator is grounded, which places the generator directly across the battery terminals when the generator has attained a charging voltage.

The compensating relay 61 comprises an electromagnetic winding 66 which is grounded at one end and has its other end connected to the coil side of the ignition switch, such as to the wire 53, so that this relay will only be included in circuit when the gauge circuit is operative. An armature or contact spring 67 is responsive to this electromagnet, being normally held in engagement with a stationary contact 68 by the adjusted leaf spring 70. When the generator voltage reaches a predetermined point, at which it is desired to have voltage compensation occur, the contact spring 67 is pulled back against a back contact 69. Referring to the circuit diagram, the wire 49 leading from the tank unit connects to this contact spring 67 and hence is normally directly connected to the gauge indicator 16 through the front contact 68. When the contact spring 67 is pulled back against the back contact 69 the circuit from the wire 49 must pass through a calibrated resistance 71 before making connection with the gauge indicator 16. This calibrated resistance compensates for the higher generator voltage, and maintains an accurate gauge reading at the indicator 16.

While the foregoing description and drawings disclose an embodiment of my invention which I deem preferable, it will of course be understood that the invention is not limited to the specific construction and arrangement therein shown and described, except in so far as claims may be drawn to specific features of construction and arrangement, but includes generically the subject-matter of the broader claims.

I claim as my invention:

1. In a liquid level gauge, the combination of a tubular arm pivotally supported at one end, a float connected to the other end of said arm and arranged to swing the latter with changes in liquid level, a pair of spaced resistance elements extending longitudinally through said arm, a globule of mercury adapted to roll gravitationally in said arm in bridging relation across said resistance elements, and an electrical circuit including said two resistance elements, said tubular arm being curved longitudinally between its pivotal end and the end connected with said float.

2. In a liquid level gauge, the combination of a tubular arm pivotally supported at one end, a float connected to the other end of said arm and arranged to incline said tube at different angles with changes in liquid level, a pair of spaced resistance elements extending longitudinally through said tube adjacent to the bottom of the bore thereof, and a globule of mercury adapted to roll gravitationally in said tube in bridging contact with said pair of resistance elements, said tube being curved substantially from end to end eccentrically with respect to its pivotal support.

3. In a liquid level gauge, the combination of a tubular arm pivotally supported at one end, a float connected to the other end of said arm and arranged to incline said tube at different angles with changes in liquid level, said tube comprising a portion curved eccentrically with respect to its pivotal support, a lining extending through said tube, two longitudinally extending resistance elements anchored in the bore of said lining, and a globule of mercury adapted to roll gravitationally in said bore in bridging contact with said resistance elements, said lining being composed of insulating material for insulating said resistance elements and said mercury from the tube.

4. In a liquid level gauge, the combination of a metallic tubular arm pivotally supported at one end, a float connected to the other end of said arm and arranged to incline said tube at different angles with changes in liquid level, said tube being curved between its ends non-concentrically of the pivotal mounting of the tube, an insulating lining extending through said tube, the bore of said lining having two longitudinally extending grooves therein, two carbonaceous resistance elements imbedded in said grooves, and a globule of mercury adapted to roll gravitationally in said bore in bridging contact with said resistance elements.

5. In a liquid level gauge, the combination of a tubular arm pivotally supported at one end, a float connected to the other end of said arm and arranged to incline said tube at different angles with changes in liquid level, an insulating lining extending through said tube, the bore of said lining having two longitudinally extending grooves therein, two carbonaceous resistance elements imbedded in said grooves, one of said resistance elements being of tapering cross-section and a globule of mercury adapted to roll gravitationally in said bore in bridging contact with said resistance elements, said tube being curved longitudinally substantially from end to end eccentrically with respect to its pivotal support.

6. In a liquid level gauge of the class wherein rise and fall of the liquid level is arranged to vary the resistance of an electrical circuit and thereby actuate an indicator which is responsive to said circuit, the combination with said circuit of means for varying its resistance in accordance with changes in liquid level comprising a tube pivotally mounted for swinging movement, a float responsive to the changes in liquid level and arranged to swing said tube, a resistance element extending longitudinally of said tube and having a varying resistance per unit of length, and a contact element in said tube engaging with said resistance element and adapted to move gravitationally along said tube as the latter is swung by said float, said tube being curved between its ends eccentrically with respect to the pivot axis about which said tube swings.

7. In a liquid level gauge of the class wherein the height of the liquid level is indicated on an indicator in accordance with changes in resistance of an electrical circuit to which said indicator is connected, the combination with said electrical circuit of means for varying its resistance in accordance with changes in liquid level comprising a tube pivotally mounted for swinging movement, a float responsive to changes in liquid level and arranged to swing said tube, two resistance elements extending longitudinally through said tube, and contact means adapted to move gravitationally in said tube in bridging relation across said resistance elements, said tube being curved longitudinally between its ends on an arc eccentric with respect to the axis of pivotal mounting of said tube, and said resistance elements being arranged whereby the resistance of said circuit varies inversely with the liquid level.

8. In a liquid level gauge, the combination of a tubular arm pivotally suported at one end, a float connected to the other end of said arm and arranged to swing the latter with changes in liquid level, a resistance element extending longitudinally through said arm, a globule of mercury adapted to roll gravitationally in said arm in contact with said resistance element, and an electrical circuit including said resistance elemnt, said tubular arm being curved longitudinally between its pivoted end and the end connected with said float.

HARRY C. STEARNS.